United States Patent [19]

Püetz et al.

[11] 3,989,988
[45] Nov. 2, 1976

[54] INTERFERENCE SUPPRESSION FEED-THROUGH CAPACITOR

[75] Inventors: Juergen Püetz, Regensburg; Oskar Rawinsky, Bad Abbach; Heinz Wagner, Regensburg, all of Germany

[73] Assignee: Siemens Aktiengesellschaft, Berlin & Munich, Germany

[22] Filed: Nov. 12, 1975

[21] Appl. No.: 631,080

[30] Foreign Application Priority Data
Nov. 27, 1974 Germany............................ 2456088

[52] U.S. Cl. .............................. 317/260; 317/242; 333/79
[51] Int. Cl.² ......................................... H01G 4/42
[58] Field of Search .............. 317/242, 260; 333/79

[56] References Cited
UNITED STATES PATENTS

| | | | |
|---|---|---|---|
| 2,721,311 | 10/1955 | Wetherwood.................. | 317/260 X |
| 3,106,671 | 10/1963 | Coleman............................. | 317/260 |
| 3,909,623 | 9/1975 | Wagner............................ | 333/79 X |

Primary Examiner—E. A. Goldberg
Attorney, Agent, or Firm—Hill, Gross, Simpson, Van Santen, Steadman, Chiara & Simpson

[57] ABSTRACT

A feed-through capacitor is provided which has a first capacitance between a phase conductor and a neutral conductor for suppressing symmetrical interference components, and a second capacitance between said neutral conductor and ground for suppressing asymmetrical interference components. Terminal inductance is minimized by utilizing roll-type capacitors which are coaxially arranged, one within the other.

7 Claims, 1 Drawing Figure

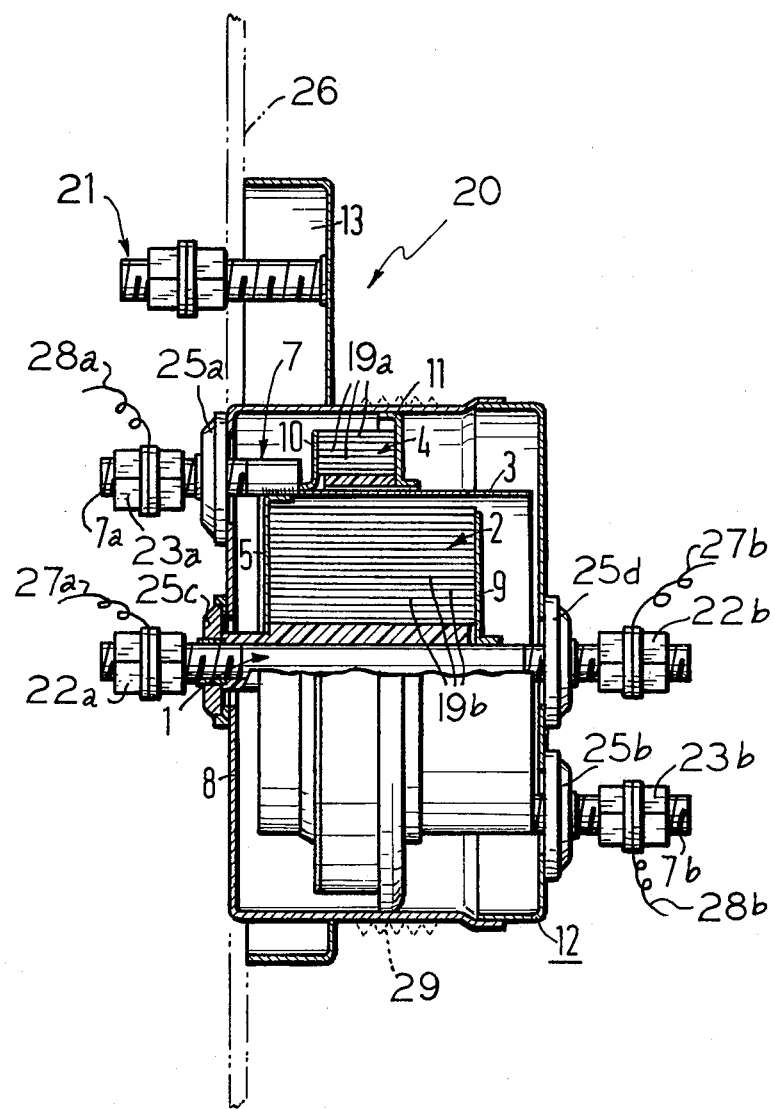

INTERFERENCE SUPPRESSION FEED-THROUGH CAPACITOR

BACKGROUND OF THE INVENTION

1. Field of the Invention

This invention relates to a feed-through capacitor and in particular to a feed-through capacitor for suppressing both symmetrical and asymmetrical interference components.

2. Description of the Prior Art

Feed-through capacitors designed to suppress both symmetrical and asymmetrical interference components are described in the German Pat. No. 899,686 and the German Publication OS 22,48,700 which corresponds with U.S. Pat. No. 3,909,623. Feed-through suppression capacitors are particularly suited for the supply conductors of electronic equipment and are also utilizable as line suppressors for shielded spaces.

Previously, two wire or multiple wire lines required multiple feed-through capacitors. In two wire installations, a phase conductor, neutral conductor, and ground conductor are employed. Symmetrical interference currents may exist between phase and neutral conductors and asymmetrical interference currents between the phase and neutral conductors and ground. The combination of several feed-through capacitors into a single feed-through capacitor arrangement is highly desirable. German Pat. No. 899,686 suggests a design in which two pole capacitors or noncoaxial four pole capacitors are employed. However, in such prior devices, the terminals in the conductors within the featured capacitors exhibit an increasing impedance near the resonant frequency due to excessive terminal inductances. Such feed-through capacitors are not fully operative at high frequencies.

SUMMARY OF THE INVENTION

An object of the present invention is to provide a structural design for dual suppression feed-through capacitors such that the interference suppression effect for both symmetrical and asymmetrical interference components is effective up to very high frequencies.

The present invention comprises a feed-through capacitor structure in which two roll-type capacitors are arranged coaxially, one within the other. A first roll-type capacitor is wound about a first or central conductor. A hollow cylindrical conductor surrounds the first capacitor and connects with a second conductor. A second roll-type capacitor is wound about the hollow cylindrical conductor. Finally, a cylindrical housing wall is arranged concentrically about the first or central conductor to surround the entire structure. One side of the first capacitor is connected directly to the central conductor and the other side of the first capacitor is connected by a soldered plate to the hollow cylindrical conductor. The second capacitor is connected by soldered plates on either end thereof to the hollow cylindrical conductor and the cylindrical housing wall. The first or central conductor comprises a feed-through terminal rod and the hollow cylindrical conductor connects with terminals at both sides of the feed-through capacitor structure. The housing comprises two parts soldered together so as to be impervious to high frequencies.

The feed-through capacitor in accordance with this invention has the advantage that it contains no inner inductances which would cause the impedance of the unit to increase at higher frequencies.

The lead-through capacitor of this invention can be secured in normal manner by threading the case and mounting to an isolation plate or wall. Alternatively, the capacitor unit may be welded to an appropriate mounting surface.

The welding of the feed-through capacitor to a housing or wall may be facilitated by use of a sheet metal component which is part of the capacitor unit. The sheet metal component may be mounted by bolts directly to the housing wall such that the structure becomes impervious to high frequency leak-through.

Connection terminals of the unit are held in position by ceramic feed-through insulators.

BRIEF DESCRIPTION OF THE DRAWING

The drawing is a side view of the feed-through capacitor unit of this invention with an upper quadral portion of the unit illustrated in cross-section to show important structural detail within the interior of the unit.

DESCRIPTION OF THE PREFERRED EMBODIMENT

Referring to the preferred embodiment of the invention shown in the drawing, a feed-through capacitor unit 20 has a first roll-type capacitor 2 and a second roll-type capacitor 4. Each of these capacitors may comprise windings or layers 19a and 19b of paper with metal foils on either side thereof. Alternatively, a synthetic material which is metalized on either one or both sides may be employed to provide conductor surfaces for the capacitors. Sides of the capacitor rolls 2 and 4 are metalized and soldered over the entire side areas to metal discs 5 and 9 for the first capacitor 2, or metal discs 10 and 11 for the second capacitor 4. By such construction, alternate metal layers of the capacitors 2 and 4 are respectively connected to the side plates, a technique well known in the art.

The capacitor unit 20 has an outer housing comprising two parts 8 and 12 which are tightly soldered together. The sheet metal component 13 connects with the capacitor housing to facilitate welding of the capacitor unit to a shielding wall 26. The stud 21 provided on the sheet metal component 13 serves as a ground terminal. Alternatively, threads 29 may be provided for wall mounting.

A central or first rod-type conductor 1 is mounted by ceramic insulators 25c and 25d along a central axis of the cylindrical two part housing 8 and 12. This conductor is threaded on either end and provided with bolts 22a and 22b for connection to lead wires 27a and 27b.

As shown in the drawing, the first capacitor 2 is wound about the central conductor 1. A circular plate 9, soldered to a front side edge of first capacitor 2, electrically connects to the central conductor 1. Another circular plate 5 is soldered to the back side edge of the first capacitor 2. The plate 5 connects with a second conductor 7 having a threaded terminal 7a with a bolt 23a mounted thereon for connecting with a lead wire 28a. A hollow cylindrical conductor 3 surrounds the first capacitor 2 and connects with both the plate 5 and conductor 7. A terminal 7b connects to the cylindrical conductor 3 at the front side of the capacitor unit 20. Connection bolts 23b are provided on terminal 7a for attachment to a lead wire 28b. Both terminals 7a and 7b are mounted to the housing portions 8 and 12 respectively by ceramic insulator units 25a and 25b.

A second capacitor 4 is wound coaxially about the first capacitor 2. A front side edge of the capacitor 4 is soldered directly to a circular plate 11 which in turn connects around its outer periphery with the housing portion 8. The back side edge of the second capacitor 4 is soldered to a circular plate 10 which has its inner periphery connected to the hollow cylindrical conductor 3.

With the structure of this invention, a feed-through capacitor unit 20 is provided having a first capacitor 2 between conductors 7 and 1 and a second capacitor 4 between conductor 7 and the two part housing 8 and 12, which is typically grounded. In one application of this invention, power lines comprising a phase conductor, a neutral conductor, and ground are respectively connected to the central or first conductor 1, the second conductor 7, and the ground conductor 21. Symmetrical interference between the phase and neutral conductors is suppressed by the first capacitor 2 and asymmetrical interference components between the neutral conductor and ground is suppressed by the second capacitor 4.

Although illustrative embodiments of the invention have been described in detail herein with reference to the accompanying drawing, it is to be understood that the invention is not limited to this precise embodiment, and that various changes and modifications can be effected therein by one skilled in the art without departing from the scope and spirit of the invention, as defined in the appended claims.

We claim as our invention:

1. A feed-through capacitor unit adapted for combining minimum terminal conductor inductance with suppression of symmetrical interference components between first and second conductors and asymmetrical interference components between a second conductor and ground, comprising:
    a. a central first conductor;
    b. a first roll-type capacitor having a first side edge electrically connected to said first conductor;
    c. a hollow cylindrical second conductor coaxially arranged about said first capacitor and electrically connected to a second side edge of said first capacitor;
    d. a second roll-type capacitor coaxially arranged about said hollow cylindrical second conductor; and
    e. a conductive cylindrical housing coaxially arranged about said second capacitor, a first side edge of said second capacitor being electrically connected to said housing and a second side edge of said second capacitor being electrically connected to said hollow cylindrical second conductor.

2. The feed-through capacitor unit of claim 1 in which the connections to said first and second side edges of said first and second capacitors are provided by circular plates soldered directly to metalized side portions of said first and second capacitors.

3. The feed-through capacitor unit of claim 1 in which said conductive cylindrical housing comprises first and second portions which are soldered together.

4. The feed-through capacitor unit of claim 1 in which said central first conductor has terminals on both ends thereof and said hollow cylindrical second conductor connects with terminals at both ends thereof.

5. The feed-through capacitor unit of claim 1 in which said central first conductor connects to a phase wire and said hollow cylindrical second conductor connects to a neutral wire.

6. The feed-through capacitor unit of claim 1 in which said conductive cylindrical housing connects to a sheet metal component for weld-mounting of the capacitor unit.

7. The feed-through capacitor unit of claim 1 in which the conductive cylindrical housing is threaded for mounting.

* * * * *